(12) United States Patent  
Vissa et al.

(10) Patent No.: US 10,997,280 B2
(45) Date of Patent: May 4, 2021

(54) BIOMETRIC IDENTITY VERIFICATION WITH LOCATION FEASIBILITY DETERMINATION

(71) Applicant: Motorola Mobility LLC, Chicago, IL (US)

(72) Inventors: Sudhir Vissa, Bensenville, IL (US); Binesh Balasingh, Naperville, IL (US); Mary Hor-Lao, Chicago, IL (US); Vivek Tyagi, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 679 days.

(21) Appl. No.: 15/234,618

(22) Filed: Aug. 11, 2016

(65) Prior Publication Data

US 2018/0046789 A1    Feb. 15, 2018

(51) Int. Cl.
*G06F 21/32*    (2013.01)
*G06F 21/31*    (2013.01)

(52) U.S. Cl.
CPC ............ *G06F 21/32* (2013.01); *G06F 21/316* (2013.01)

(58) Field of Classification Search
CPC ............................... G06F 21/32; G06F 21/316
See application file for complete search history.

(56) References Cited

U.S. PATENT DOCUMENTS

| | | | |
|---|---|---|---|
| 6,317,686 B1* | 11/2001 | Ran | G01C 21/3691 701/117 |
| 7,360,248 B1* | 4/2008 | Kanevsky | G06F 21/31 726/21 |
| 2008/0146157 A1* | 6/2008 | Aaron | H04M 1/72566 455/66.1 |

(Continued)

FOREIGN PATENT DOCUMENTS

JP    2004-118456 A    4/2004

OTHER PUBLICATIONS

Srinidhi MB and R. Roy, "A web enabled secured system for attendance monitoring and real time location tracking using Biometric and Radio Frequency Identification (RFID) technology" 2015 International Conference on Computer Communication and Informatics (ICCCI), Coimbatore, India, 2015, pp. 1-5 (Year: 2015).*

(Continued)

*Primary Examiner* — Robert B Leung
*Assistant Examiner* — Sameera Wickramasuriya
(74) *Attorney, Agent, or Firm* — Philip H. Burrus, IV

(57) ABSTRACT

A method includes receiving an incoming biometric identification request on a first device from a user. First location data for the first device is determined. Second location data associated with at least one previous biometric identification request associated with the user is retrieved. A second level identification request is selectively initiated on the first device based on at least the first and second location data. A device includes a location module to determine first location data for the device, a biometric sensor to generate an (Continued)

incoming biometric identification request from a user, and a processor to retrieve second location data associated with at least one previous biometric identification request associated with the user and selectively initiate a second level identification request on the device based on at least the first and second location data.

20 Claims, 3 Drawing Sheets

(56) References Cited

U.S. PATENT DOCUMENTS

| | | |
|---|---|---|
| 2009/0158404 A1 | 6/2009 | Hahn et al. |
| 2010/0245042 A1 | 9/2010 | Tsubaki |
| 2013/0152216 A1* | 6/2013 | Stevens .................. G06Q 20/04 |
| | | 726/28 |
| 2014/0207373 A1* | 7/2014 | Lerenc ............... G01C 21/3438 |
| | | 701/465 |
| 2014/0259128 A1* | 9/2014 | Fear ........................ H04L 63/08 |
| | | 726/5 |
| 2015/0067890 A1* | 3/2015 | Bataller ................. G06Q 10/00 |
| | | 726/28 |
| 2016/0070899 A1* | 3/2016 | Vemula .................. G06F 21/606 |
| | | 726/19 |
| 2017/0091435 A1* | 3/2017 | Alderucci ............... G06F 21/32 |
| 2017/0214712 A1* | 7/2017 | Maxwell ................. G06F 21/46 |
| 2017/0268891 A1* | 9/2017 | Dyrnaes ............ G01C 21/3423 |

OTHER PUBLICATIONS

Lami, Ihsan and Kuseler, Torben and Al-Assam, Hisham and Jassim, Sabah A. (2010) LocBiometrics: Mobile phone based multifactor biometric authentication with time and location assurance. In: 18th Telecommunications forum TELFOR 2010, Nov. 23-25, 2010. (Year: 2010).*

Combined Search and Examination Report under Sections 17 and 18(3) for Great Britain Patent Application No. GB1711828.2 dated Jan. 15, 2018.

* cited by examiner

BIOMETRIC IDENTITY VERIFICATION WITH LOCATION FEASIBILITY DETERMINATION

BACKGROUND

Field of the Disclosure

The disclosed subject matter relates generally to mobile computing systems and, more particularly, to performing biometric identity verification with location feasibility determination.

Description of the Related Art

Many mobile devices provide different techniques to allow users to verify their identities. Biometric sensors generally provide an enhanced level of verification, however, they are still subject to falsification by duplication. For example, with fingerprint verification, a fingerprint may be lifted from a user. A latex duplication or a high resolution image may be employed to provide a false identification. Other biometric sensor types are also vulnerable to falsification.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-4 illustrate example techniques for performing biometric identity verification with feasibility determination. To enhance security, biometric identification verification events are monitored for a user across one or multiple devices. Location information associated with the events is employed to determine if it is feasible that the user could have traveled between the locations in the time elapsed between the events. A second level identity verification may be employed based on the location information.

Figure 1:
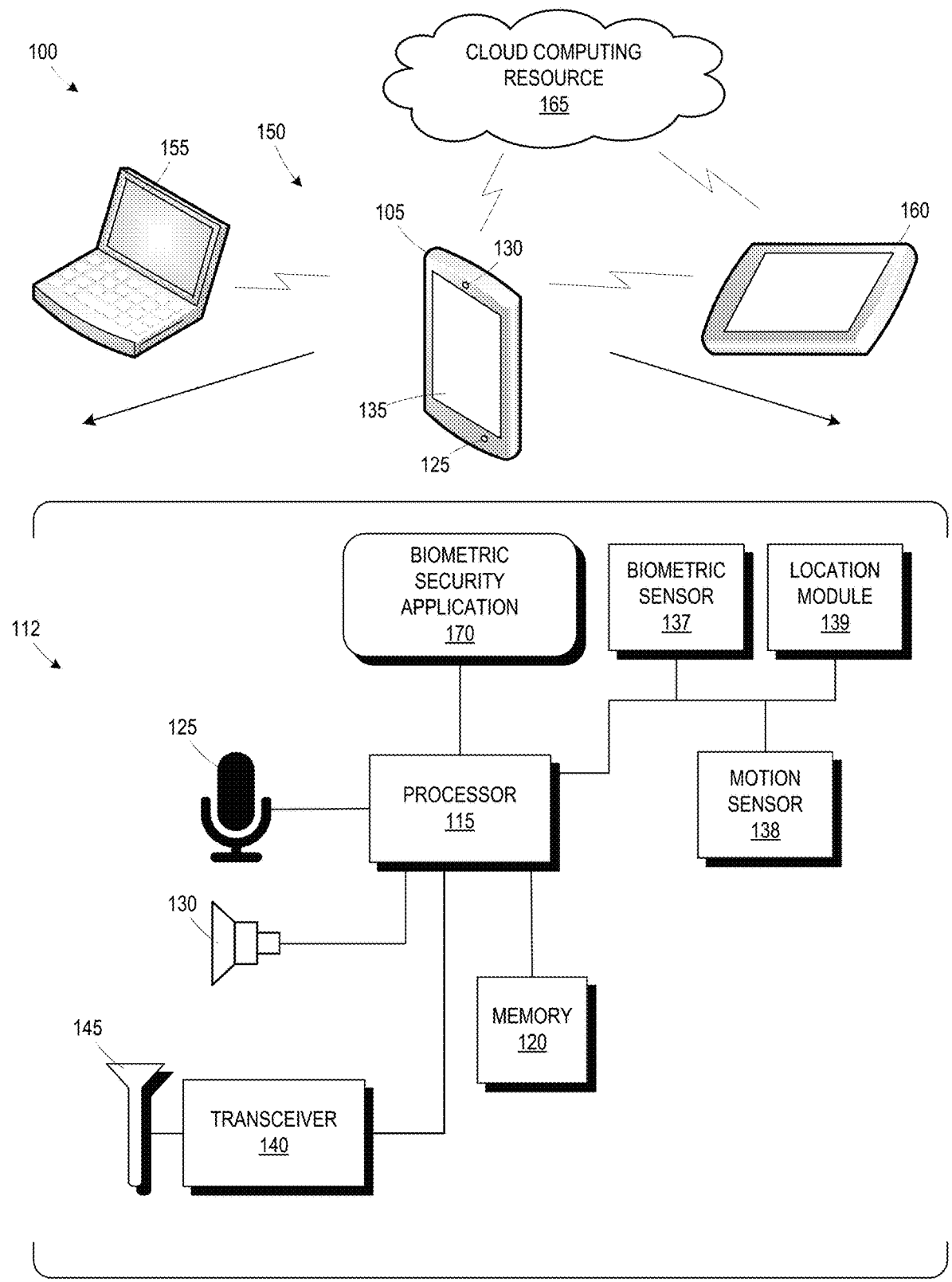
FIG. 1 is a simplified block diagram of a communication system for performing biometric identity verification with feasibility determination, according to some embodiments disclosed herein.

FIG. 1 is a simplistic block diagram of a communications system 100 including a first device 105. The first device 105 implements a computing system 112 including, among other things, a processor 115, a memory 120, a microphone 125, a speaker 130, a display 135, a biometric sensor 137 (e.g., fingerprint sensor, retinal scanner, etc.), a motion sensor 138, and a location module 139 (e.g., WiFi or other location sensing device). The memory 120 may be a volatile memory (e.g., DRAM, SRAM) or a non-volatile memory (e.g., ROM, flash memory, hard disk, etc.). The first device 105 includes a transceiver 140 for transmitting and receiving signals via an antenna 145 over a communication link 150. The transceiver 140 may include one or more radios for communicating according to different radio access technologies, such as cellular, Wi-Fi, Bluetooth®, etc. The communication link 150 may have a variety of forms. In some embodiments, the communication link 150 may be a wireless radio or cellular radio link. The communication link 150 may also communicate over a packet-based communication network, such as the Internet.

As illustrated in FIG. 1, the first device 105 may be one of a plurality of connected devices 105, 155, 160 associated with the same user. The other connected devices 155, 160 may also include a computing system having some or all of the entities in the computing system 112 of the first device 105, such as a processor, a memory and a transceiver. Any number of connected devices of different types may be included when using the method and systems disclosed herein. In various embodiments, the devices 105, 155, 160 may be embodied in handheld or wearable devices, such as laptop computers, handheld computers, tablet computers, mobile devices, telephones, personal data assistants, music players, game devices, wearable computing devices, and the like. One or more of the connected devices 155, 160 could also be a non-portable device, such as a desktop computer. For example, the device 155 may be a laptop computer and the device 160 may be a tablet computer. To the extent certain example aspects of the devices 105, 155, 160 are not described herein, such example aspects may or may not be included in various embodiments without limiting the spirit and scope of the embodiments of the present application as would be understood by one of skill in the art.

The user may use biometric identity verification to access one or more of the devices 105, 155, 160. In some embodiments, a cloud computing resource 165 may interface with the devices 105, 155, 160 to facilitate the exchange of biometric identification history data, with some or all of the devices 105, 155, 160 and/or to perform biometric authentication request processing, as described herein. In one illustrative embodiment, the biometric identification history data may include a user identifier (e.g., based on the output of the biometric sensor 137), a device identifier, location data, time data, and device modality data for each biometric identification request transacted by the user on one of the devices 105, 155, 160, as described in greater detail herein.

In the first device 105, the processor 115 may execute instructions stored in the memory 120 and store information in the memory 120, such as the results of the executed instructions. Some embodiments of the processor 115, the memory 120, and the microphone 125 may be configured to implement a biometric security application 170 and perform portions of the method 200 shown in FIGS. 2-4 and discussed below. For example, the processor 115 may execute the biometric security application 170 to monitor biometric identification requests and impose additional security measures responsive to identifying suspect usage patterns associated with one or more of the devices 105, 155, 160. In general, one or more of the devices 105, 155, 160 may be capable of implementing various elements of the methods shown in FIGS. 2-4. In one example, various elements of the methods may be implemented on the first device 105. In some embodiments, the cloud computing resource 165 may also be used to perform one or more elements of the methods.

Figure 2:
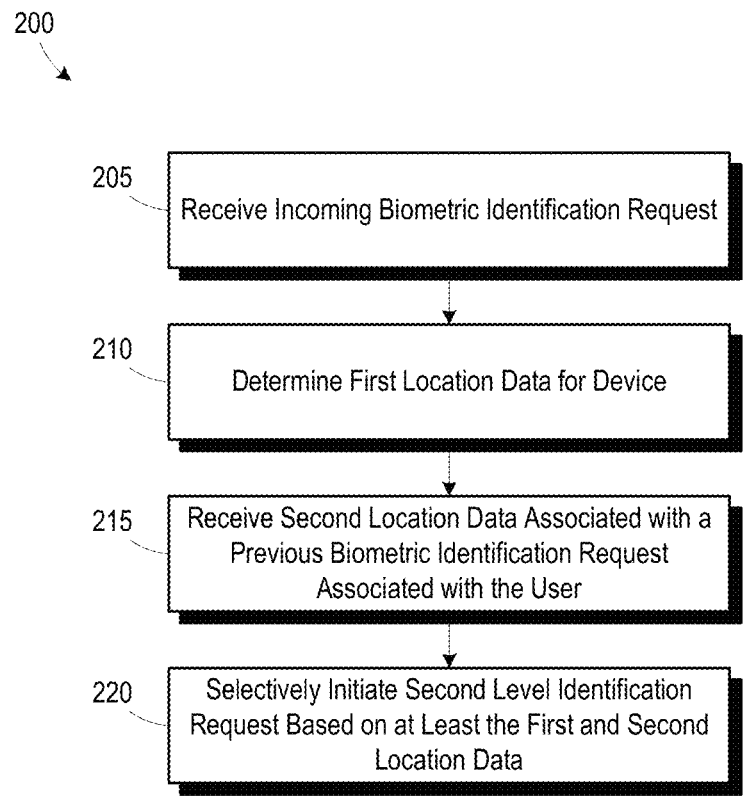
FIG. 2 is a flow diagram of a method for performing biometric identity verification with feasibility determination, according to some embodiments disclosed herein.

FIG. 2 is a flow diagram of an illustrative method 200 for monitoring biometric identification requests, in accordance with some embodiments disclosed herein. In method block 205, an incoming biometric identification request is received. For purposes of illustration, it is assumed that the request is received on the device 105. In one embodiment, the user interfaces with the biometric sensor 137 to attempt to gain access to the device 105. The device 105 may determine that the biometric data is appropriate for unlocking the device 105, but may impose additional scrutiny on the incoming request. In some embodiments, all incoming requests are subjected to a second level of scrutiny, while in other embodiments, the incoming requests may be sampled. For example, if a particular request is scrutinized and approved, a time window may be imposed (e.g., 5 minutes) where subsequent requests are not subjected to additional scrutiny. Such an approach may be employed to reduce latency associated with unlocking the device 105.

In method block 210, the biometric security application 170 determines first location data for the device 105, such as by querying the location module 139. The biometric security application 170 may forward the first location data, a user identifier, and a device identifier to the cloud computing resource 165 for evaluation. Time data for the incoming biometric identification request may be sent by the biometric security application 170 or inferred based on the time the request data was forwarded for authentication to the cloud computing resource 165.

In method block 215, second location data associated with a previous biometric identification request associated with the user is retrieved. For example, a library of biometric identification requests may be maintained (e.g., by storage in the cloud computing resource 165). The library entries may include request time, user identity, device identity, location and time.

In method block 220, a second level identification request is selectively initiated on the device 105 based on at least the first and second location data. Various techniques may be employed using the location data to determine if one of the devices 105, 155, 160 may have been obtained by another party. In some embodiments, the cloud computing resource 165 receives the first location data collected in method block 210 from the biometric security application 170 and performs an analysis to determine if the incoming biometric identity verification request is consistent with the other requests previously logged by the user on one or more of the devices 105, 155, 160. The cloud computing resource 165 may send an indicator (e.g., Boolean flag) to the biometric security application 170 indicating that a second level identification is required.

Figure 3:
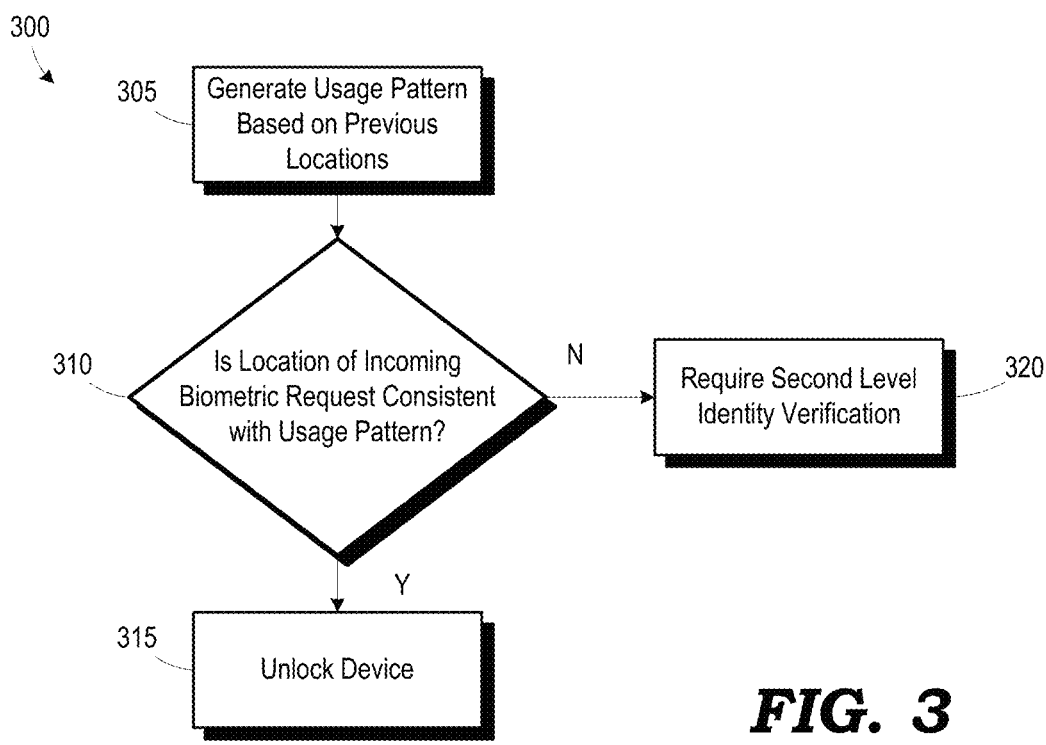
FIG. 3 is a flow diagram of a method for determining feasibility based on usage patterns, according to some embodiments disclosed herein.

FIG. 3 is a flow diagram of a method 300 for determining feasibility based on usage patterns, according to some embodiments disclosed herein. In method block 305, a usage pattern for the user may be established based on the library of biometric identification requests and the previous locations. In some embodiments, the cloud computing resource 165 may generate and store the usage pattern. In method block 310, the location of the incoming biometric identification request is matched against the usage pattern to determine consistency. For example, a location nexus may be determined indicating the locations frequented by the user based on the usage patterns. If the location for the incoming request is outside the location nexus determined based on the usage pattern, it may indicate that the device 105 has been stolen and that another party is attempting to access the device 105. The location nexus may also be time based, such that the location associated with the incoming request may be in a frequented location, but it may come at a time that is inconsistent with the usage pattern. If the location of the incoming biometric identification request is consistent with the usage pattern in method block 310, the device 105 is unlocked in method block 315. If the location of the incoming biometric identification request is not consistent with the usage pattern in method block 310, a second level identify verification is required in method block 320.

Figure 4:
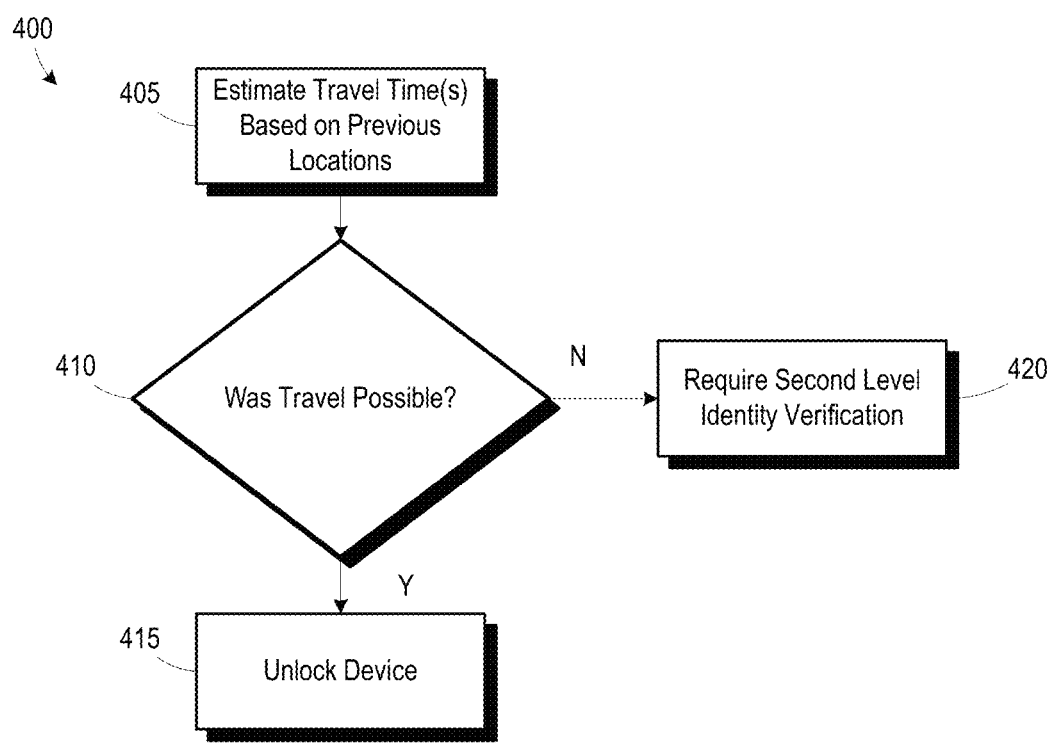
FIG. 4 is a flow diagram of a method for determining feasibility based on a travel nexus, according to some embodiments disclosed herein.

FIG. 4 is a flow diagram of a method for determining feasibility based on a travel nexus, according to some embodiments disclosed herein. The first location data may be compared to the second location data for the immediately preceding biometric identification request or requests. By comparing the locations, it may be determined that it would not have been feasible for the user to travel between the locations in the time elapsed between the requests. In method block 405, a travel time for traveling between the first and second locations is estimated. In determining the estimate, travel schedules (e.g., plane schedules, train schedules, estimated driving time, walking time, biking time, etc.) may be employed to estimate possible travel times. For example, a minimum travel time may be determined based on the distance between the locations and the available transportation resources. In some embodiments, device modality may also be provided with the biometric authentication requests and stored in the library. Output from the motion sensor 138 may be used to determine if the user is walking, running, driving, biking, etc. In general, motion patterns received from the motion sensor 138 are matched by the processor 115 to previously established patterns to determine device modality. The modality at the time of the incoming request or for the time period preceding the incoming request may by communicated to the cloud computing resource 165 or employed by the biometric security application 170. In some embodiments, the cloud computing resource 165 may access the travel schedules and optionally consider device modality to determine the estimated travel time. In method block 410, it is determined if travel between the first and second locations was possible (e.g., based on a likelihood metric). If the travel was possible, the device 105 is unlocked in method block 415. If the travel was not possible, in method block 410, a second level identify verification is required in method block 420.

In some embodiments, the incoming biometric identity verification request and the previous request(s) may be associated with the same user, but not the same device 105, 155, 160. Feasibility may be evaluated for multiple entries in the library (e.g., an estimated travel time in the context of FIG. 4). For example, the feasibility may be determined for the incoming biometric identity request against the most recent previous requests for each device 105, 155, 160 associated with the user.

Various techniques may be employed to implement the second level identity verification. In some embodiments, the user may be prompted to enter a password or verification code. In some embodiments, a verification code may be transmitted to one of the devices 155, 160 other than the device 105 or the user's alternate work or home phone, and the user may be prompted for the verification code. For example, the cloud computing resource 165 may communicate with the other device 155, 160. When the biometric security application 170 requires the second level verification, the user may be prompted for how they want to receive the verification code.

In some embodiments, where connectivity is not present, biometric identification requests may be cached and uploaded to the cloud computing resource 165 when connectivity is restored. If connectivity is not present, the biometric security application 170 may provisionally accept the authentication requests and unlock the device 105 based on the output of the biometric sensor 137. When the requests are later processed, the cloud computing resource 165 may send a signal to the biometric security application 170 to immediately lock the device 105 and require a second level identity verification if the feasibility check fails.

In some embodiments, certain aspects of the techniques described above may be implemented by one or more processors of a processing system executing software. The methods 200, 300, 400 described herein may be implemented by executing software on a computing device, such as the processor 115 of FIG. 1, however, such methods are not abstract in that they improve the operation of the devices 105, 155, 160 and the user's experience when operating the devices 105, 155, 160. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes receiving an incoming biometric identification request on a first device from a user. First location data for the first device is determined. Second location data associated with at least one previous biometric identification request associated with the user is retrieved. A second level identification request is selectively initiated on the first device based on at least the first and second location data.

A device includes a location module to determine first location data for the device, a biometric sensor to generate an incoming biometric identification request from a user, and a processor to retrieve second location data associated with at least one previous biometric identification request associated with the user and selectively initiate a second level identification request on the device based on at least the first and second location data.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising:
   sampling a plurality of incoming biometric identification requests to select an incoming biometric identification request on a first device from a user for a second level of scrutiny;
   determining first location data for the first device;
   retrieving second location data associated with at least one previous biometric identification request associated with the user;
   determining a time interval between the incoming biometric identification request and the previous biometric identification request;
   estimating a travel time based on the first and second location data and transportation schedule data; and
   selectively initiating a second level identification request on the first device based on the estimated travel time exceeding the time interval.

2. The method of claim 1, further comprising accessing a library of identification verification entries associated with the user, each identification verification entry including at least time data and location data.

3. The method of claim 2, wherein each identification verification entry further includes device identity.

4. The method of claim 2, further comprising:
   determining a usage pattern of the user based on the library; and
   requiring a second level of identity verification responsive to the incoming biometric identification request diverging from the usage pattern.

5. The method of claim 4, further comprising requiring the second level of identity verification responsive to determining that time data associated with the incoming biometric identification request diverges from the usage pattern.

6. The method of claim 4, further comprising requiring the second level of identity verification responsive to determining that the first location data associated with the incoming biometric identification request diverges from the usage pattern.

7. The method of claim 1, wherein the previous biometric identification request is associated with a second device other than the first device.

8. The method of claim 1, wherein estimating the travel time using the transportation schedule data further comprises:
　　determining a device motion modality using a motion sensor of the device; and
　　estimating the travel time based on the device motion modality and the transportation schedule data.

9. The method of claim 1, further comprising:
　　accessing a library of identification verification entries associated with the user, each identification verification entry including at least time data, location data, and device identity data;
　　determining a time interval between the incoming biometric identification request and a selected subset of the identification verification entries, each identification verification entry in the subset having different device identity data;
　　estimating a travel time for each of the identification verification entries in the subset based on the first location data and the location data for each of the identification verification entries in the subset; and
　　selectively initiating the second level identification request on the first device responsive to any of the estimated travel times exceeding the time interval.

10. A device, comprising:
　　a location module to determine first location data for the device;
　　a biometric sensor to generate an incoming biometric identification request from a user; and
　　a processor to provisionally accept the incoming biometric identification request from the user and unlock the device based upon output of the biometric sensor;
　　the processor to, at a time after unlocking the device, retrieve second location data associated with at least one previous biometric identification request associated with the user, determine a time interval between the incoming biometric identification request and the previous biometric identification request, estimate a travel time based on the first and second location data and transportation schedule data, send a signal immediately locking the device, and selectively initiate a second level identification request on the device based on the estimated travel time exceeding the time interval.

11. The device of claim 10, wherein the processor is to access a library of identification verification entries associated with the user, each identification verification entry including at least time data and location data.

12. The device of claim 11, wherein each identification verification entry further includes device identity.

13. The device of claim 10, wherein the processor is to determine a usage pattern of the user based on a library, and require a second level of identity verification responsive to the incoming biometric identification request diverging from the usage pattern.

14. The device of claim 13, wherein the processor is to require the second level of identity verification responsive to determining that time data associated with the incoming biometric identification request diverges from the usage pattern.

15. The device of claim 13, wherein the processor is to require the second level of identity verification responsive to determining that the first location data associated with the incoming biometric identification request diverges from the usage pattern.

16. The device of claim 10, wherein the previous biometric identification request is associated with a second device other than the device.

17. The device of claim 10, wherein the processor is to estimate the travel time by determining a device motion modality using a motion sensor of the device and estimating the travel time based on the device motion modality and the transportation schedule data.

18. The device of claim 10, wherein the processor is to access a library of identification verification entries associated with the user, each identification verification entry including at least time data, location data, and device identity data, determine a time interval between the incoming biometric identification request and a selected subset of the identification verification entries, each identification verification entry in the subset having different device identity data, estimate a travel time for each of the identification verification entries in the subset based on the first location data and the location data for each of the identification verification entries in the subset, and selectively initiate the second level identification request on the device responsive to any of the estimated travel times exceeding the time interval.

19. The method of claim 1, further comprising precluding the second level of scrutiny for additional incoming biometric identification requests received within a predefined duration following selection of the incoming biometric identification request.

20. The device of claim 10, further comprising a biometric security application to immediately lock the device in response to the signal from the processor.

* * * * *